(12) United States Patent
Hutto et al.

(10) Patent No.: US 12,720,002 B2
(45) Date of Patent: Aug. 25, 2026

(54) PROVIDING ASSISTANCE TO IMPAIRED USERS WITHIN A CONFERENCING SYSTEM

(71) Applicant: Zoom Video Communications, Inc., San Jose, CA (US)

(72) Inventors: Ronald Hutto, Willis, TX (US); Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 6 days.

(21) Appl. No.: 17/986,540

(22) Filed: Nov. 14, 2022

(65) Prior Publication Data

US 2024/0163390 A1 May 16, 2024

(51) Int. Cl.
*H04L 65/403* (2022.01)
*H04N 5/262* (2006.01)
*H04N 5/278* (2006.01)

(52) U.S. Cl.
CPC ......... *H04N 5/2628* (2013.01); *H04L 65/403* (2013.01); *H04N 5/278* (2013.01)

(58) Field of Classification Search
CPC ..... H04N 5/2628; H04N 5/278; H04L 65/403
See application file for complete search history.

(56) References Cited

U.S. PATENT DOCUMENTS 9,100,540 B1 * 8/2015 Gates ....................... H04N 7/15
10,127,833 B1 * 11/2018 Utley .................. H04L 65/4053
10,289,903 B1 * 5/2019 Chandler ................. G06N 3/08
10,359,836 B2 * 7/2019 Keohane ................... G06F 3/01
11,043,219 B1 * 6/2021 Walters ................. G10L 21/013
11,157,682 B2 * 10/2021 Bradley .................. G10L 15/02
11,460,973 B1 * 10/2022 Mealin ..................... G06N 3/09
11,614,854 B1 * 3/2023 Fitch ................... H04L 65/1089 715/753
11,769,126 B1 * 9/2023 Montenegro ............ A45C 1/12 705/42
11,792,468 B1 * 10/2023 Legatski .......... H04N 21/47217 725/34
11,907,677 B1 * 2/2024 Borhany ................. G06F 40/51
2006/0125914 A1 * 6/2006 Sahashi .................. H04N 7/147 348/E7.083
2009/0043583 A1 * 2/2009 Agapi ..................... G10L 13/04 704/260
2011/0088534 A1 * 4/2011 Takashima ............. G10H 1/366 84/622

(Continued)

*Primary Examiner* — Nicholas P Celani
*Assistant Examiner* — Wuji Chen
(74) *Attorney, Agent, or Firm* — Kilpatrick Townsend & Stockton LLP

(57) ABSTRACT

The present disclosure relates to systems and methods for providing assistance to visually impaired and/or hearing-impaired users accessing a video conference. The systems and methods include initiating a virtual meeting hosting a plurality of participants, detecting a presence of at least one impaired participant from the plurality of participants, loading one or more audio visual settings for providing assistance to the at least one impaired participant, and automatically providing adjustments for one or more audio visual elements provided to the at least one impaired participant, based on the one or more audio visual settings.

20 Claims, 10 Drawing Sheets

(56) References Cited

U.S. PATENT DOCUMENTS

2015/0188928 A1* 7/2015 Shapiro ................. H04L 63/105 709/206
2016/0062987 A1* 3/2016 Yapamanu .............. H04M 3/42 704/2
2016/0306784 A1* 10/2016 Bradley .................. G10L 25/48
2017/0359467 A1* 12/2017 Norris ..................... H04S 7/305
2018/0131904 A1* 5/2018 Segal ................... G11B 27/031
2018/0225988 A1* 8/2018 Morgado ............. G09B 21/009
2019/0171716 A1* 6/2019 Weber ...................... H04N 7/15
2020/0258525 A1* 8/2020 Mcquiston .............. G10L 15/26
2020/0388284 A1* 12/2020 Candelore ...... H04N 21/440236
2021/0097267 A1* 4/2021 Stokman ................ G06V 40/20
2021/0157616 A1* 5/2021 Trim .................... G09B 21/006
2021/0165951 A1* 6/2021 Bradley ................ G06F 3/0482
2021/0193136 A1* 6/2021 Walters ................... G06T 13/40
2021/0281774 A1* 9/2021 Pei ..................... H04N 21/4884
2021/0287656 A1* 9/2021 Bonafonte .............. G10L 15/22
2021/0335502 A1* 10/2021 Cordell ................... G06F 40/58
2021/0373676 A1* 12/2021 Jorasch ................. G06F 3/0383
2021/0374391 A1* 12/2021 Jorasch .................. G06V 40/19
2021/0400142 A1* 12/2021 Jorasch ............... H04L 65/1069
2022/0036760 A1* 2/2022 Letzt ...................... G16H 50/30
2022/0058999 A1* 2/2022 Vleugels .................. A61B 3/14
2022/0067098 A1* 3/2022 Berry .................... G06F 16/958
2022/0121723 A1* 4/2022 Page ..................... G06F 11/263
2022/0139417 A1* 5/2022 Maxwell .................. H04N 7/15 704/235
2022/0201248 A1* 6/2022 Olivieri .................. H04N 5/272
2022/0382907 A1* 12/2022 Siohan ................... H04N 7/155
2022/0383871 A1* 12/2022 Kumar .................... G06F 3/167
2023/0073828 A1* 3/2023 Vendrow ............... H04L 65/403
2023/0260534 A1* 8/2023 Escudero ................ H04S 1/007 704/3
2023/0410069 A1* 12/2023 Montenegro ........... G10L 15/22
2024/0021102 A1* 1/2024 Coudert ............... G09B 21/009
2024/0070251 A1* 2/2024 Maizels .................. G06F 21/32
2024/0078844 A1* 3/2024 Hamlin ............... H04L 12/1822
2024/0163390 A1* 5/2024 Hutto ................... H04N 5/2628
2025/0036889 A1* 1/2025 Fu ......................... G06T 13/205

* cited by examiner

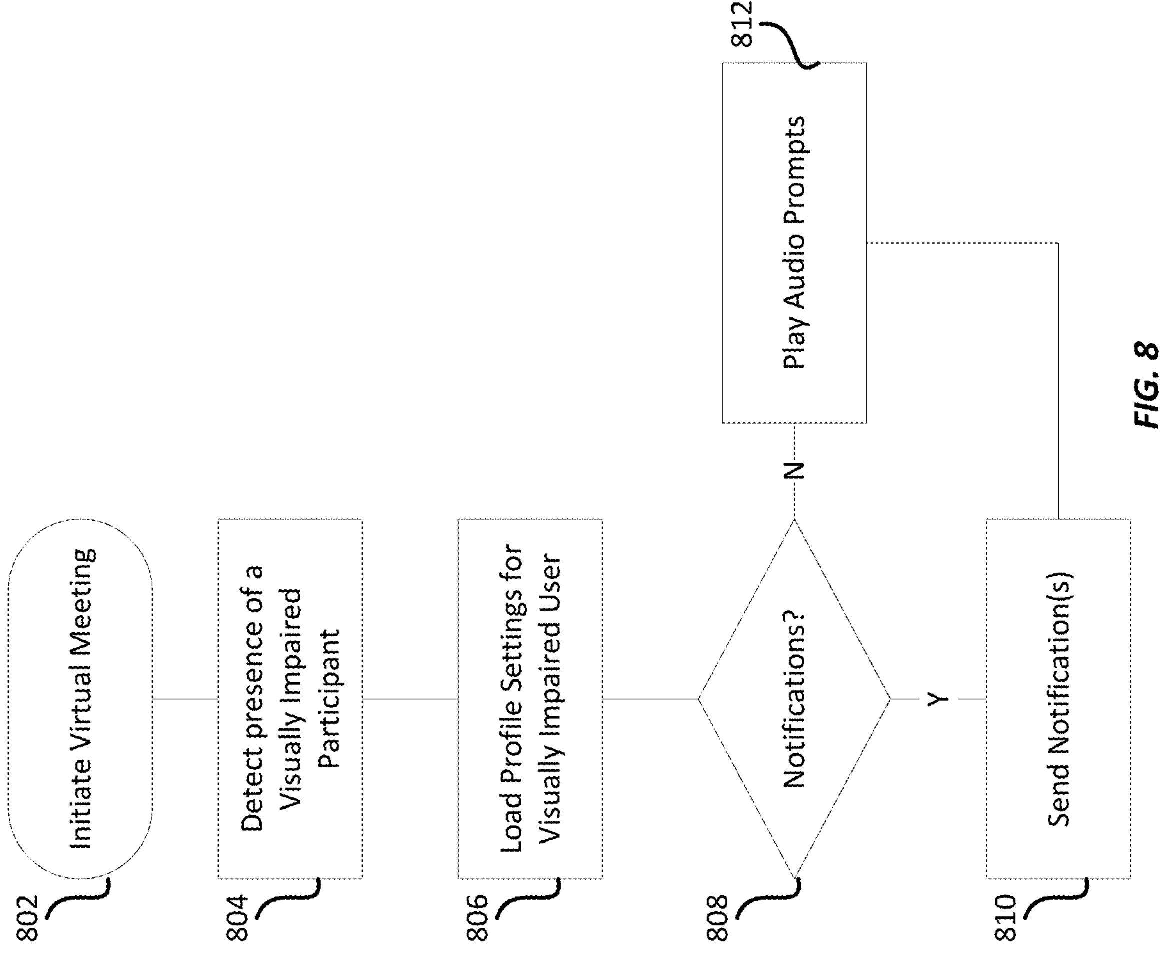
FIG. 8
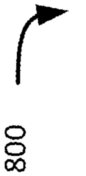

900

PROVIDING ASSISTANCE TO IMPAIRED USERS WITHIN A CONFERENCING SYSTEM

FIELD

The present disclosure relates generally to providing assistance to impaired users within a conferencing system, and more particularly, to providing assistance to visually impaired and/or hearing-impaired users accessing a video conferencing system.

BRIEF DESCRIPTION OF THE DRAWINGS

FIG. 8 is a flow chart depicting a process for assisting a visually-impaired participant in a virtual conference in accordance with various embodiments.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

For visually or hearing-impaired users attending a video conference, example systems and methods according to this disclosure can tailor the experience to best benefit those users in their experience of the virtual meeting. When a visually impaired user attends a virtual meeting, it may be difficult for them to identify who is speaking or follow what is transpiring during the meeting.

The present disclosure enables the user to activate one or more features to audibly announce to the user who is speaking and optionally when different functions (e.g., screen share) are activated during a meeting. These announcements can be limited to the client for the visually impaired user such that it does not disrupt or confuse other users.

In addition, hearing-impaired users may make use of an interpreter during virtual conference who can translate from sign language to spoken language and back. But when multiple hearing-impaired users join a meeting and are making use of the same interpreter (participating locally or from another location), it may be difficult for other users to identify who is speaking since all of the hearing-impaired users would be translated using the same interpreter and with the same voice. To help clarify which hearing-impaired person is speaking, each of the hearing-impaired users can select a style of voice they want to represent them as the interpreter speaks. When an interpreter is speaking on behalf of a hearing-impaired user relying on sign language to communicate, the interpreter's voice will be modified to match the hearing-impaired user's selected style of voice. Therefore, when the interpreter begins to speak on behalf of different users, different voices will be used to help others differentiate between each hearing-impaired user. Additionally, the present disclosure enables the user to activate one or more features to visually enhance their experience. Specifically, when a hearing-impaired user joins a virtual meeting or as a part of their user profile with a virtual conferencing provider, they can indicate that they are hearing impaired and features such as closed captioning, video on (for hand signaling), and pinned display of their interpreter can be automatically enabled.

System Overview

Figure 1:
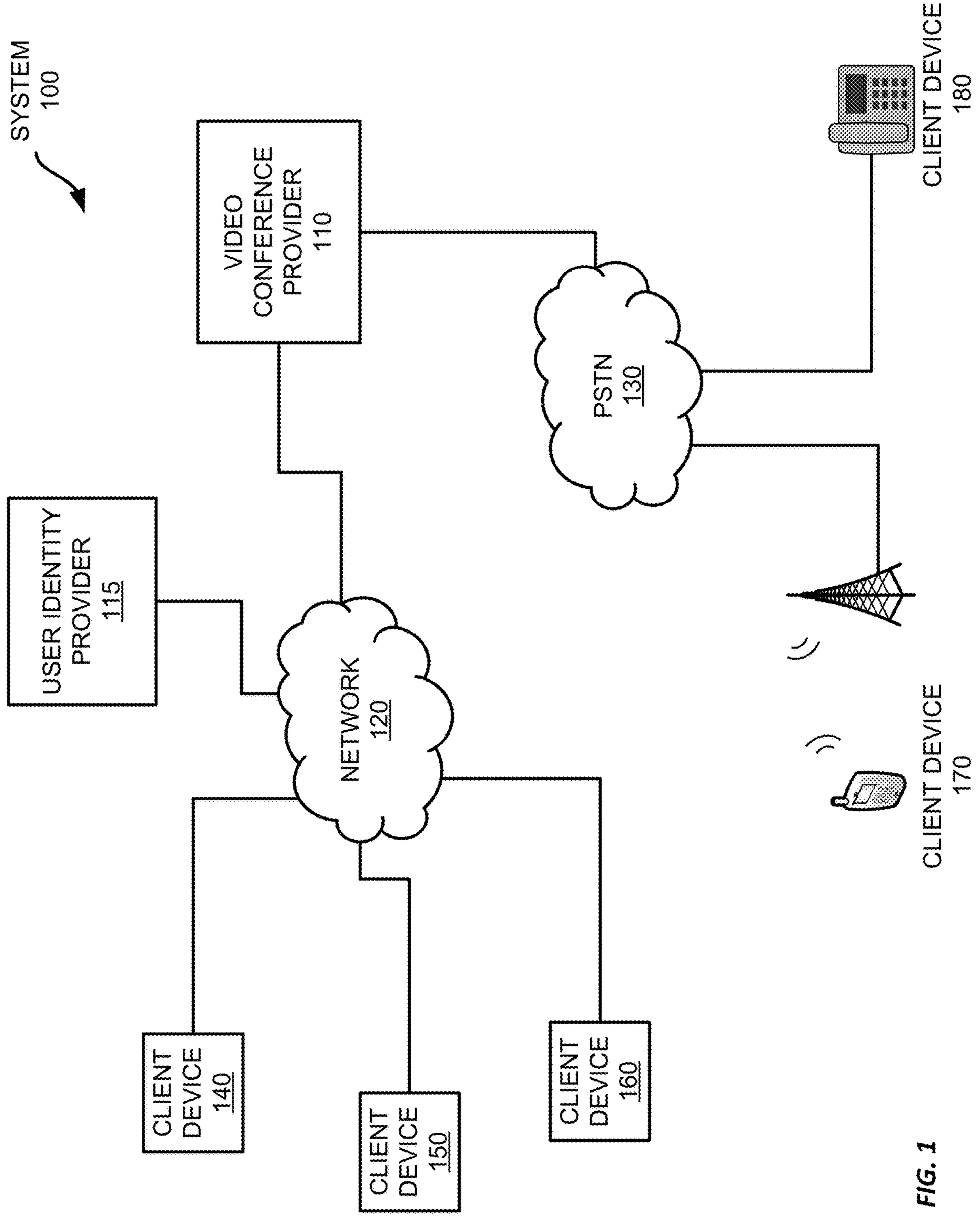
FIG. 1 is an illustration depicting an example video conferencing system in accordance with various embodiments.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2A:
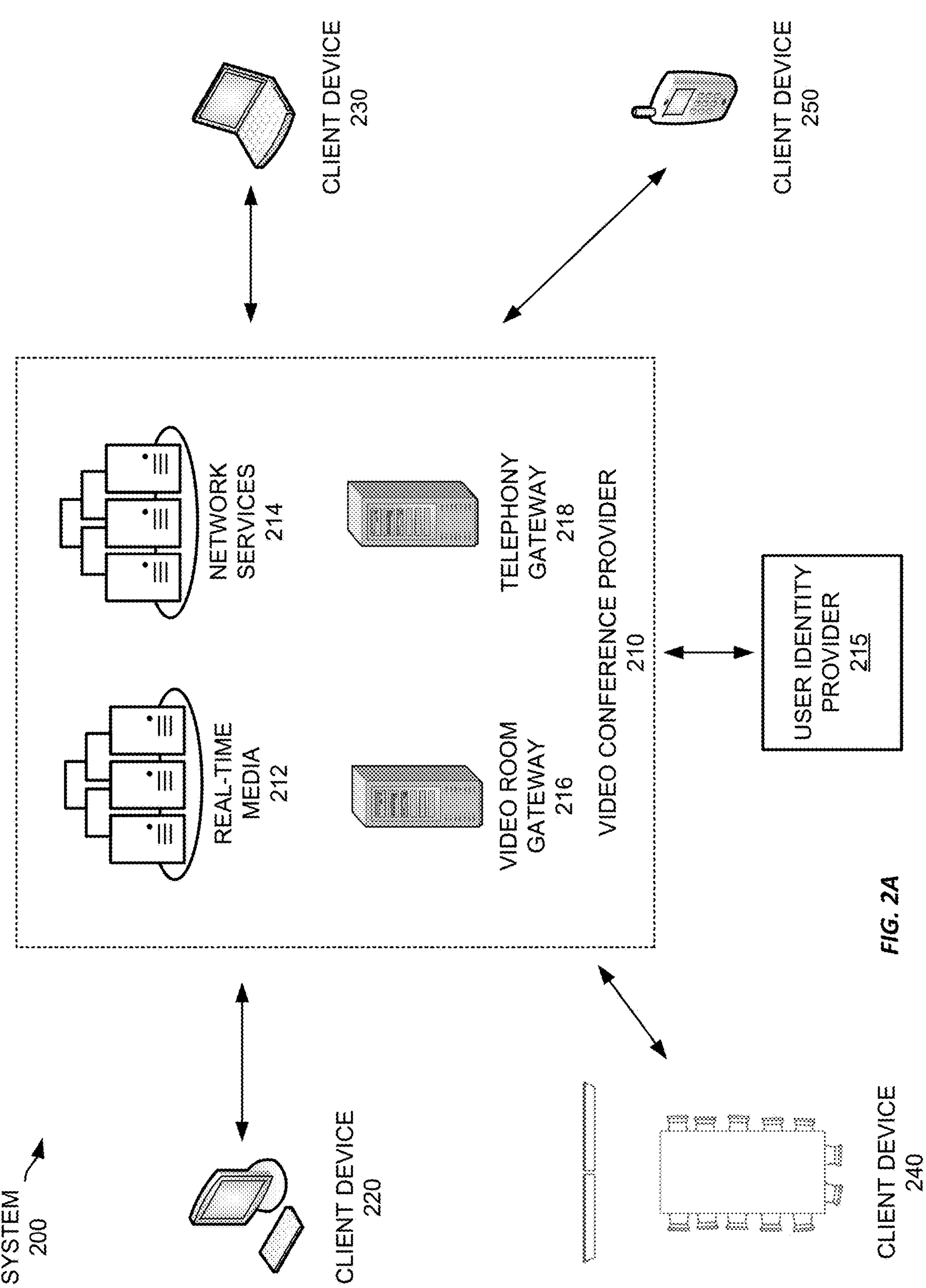
FIGS. 2A and 2B are illustrations depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main"

videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 2B:
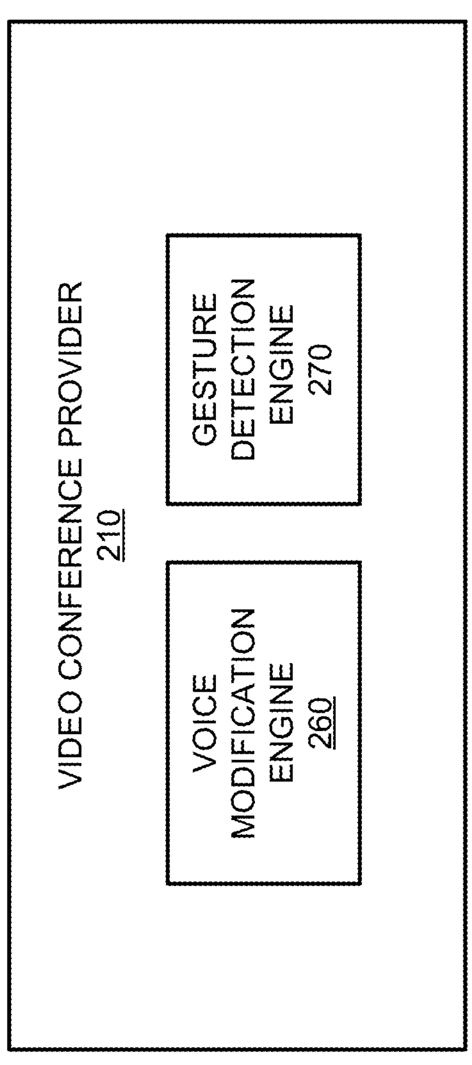

Referring now to FIG. 2B, FIG. 2B shows an example of components included within a video conference provider 210. The video conference provider 210 includes any combination of a voice modification engine 260 and a gesture detection engine 270. Although depicted as part of the video conference provider 210 in FIG. 2B, each of the voice modification engine 260 and the gesture detection engine 270 can be provide on any combination of the servers or clients, for example, depicted in systems 100, 200. For example, either or both of the voice modification engine 260 and the gesture detection engine 270 can be implemented on a user's client device (e.g., client 140-180, 220-250)

In some embodiments, the voice modification engine 260 can be configured to receive an audio input (of a user speaking) from one of the client devices and perform one or more modifications to the audio input to make the user's voice sound differently. The modifications can include adjusting one or more of a pitch, frequency, tone, etc. Thereafter, the voice modification engine 260 can output the modified version of the audio (e.g., user's voice) to the other participants in the virtual meeting. The voice modification can be performed when a user is participating in a virtual meeting as an interpreter for one or more hearing-impaired users. In some embodiments, the voice modification engine 260 can manage different voice modifications, profiles, selections, etc. for different hearing-impaired users being linked to the interpreter. Therefore, when multiple hearing-impaired participants are associated with the same interpreter, then different modification(s) are applied based on which hearing-impaired user is the active speaker (e.g., which user is signing). For example, when a first hearing impaired participant is signing and has assigned a male voice modification(s), the voice modification engine 260 will use the association between the first hearing-impaired user and the male voice selection to be applied to the voice of the linked interpreter and when a second hearing-impaired user is signing and has assigned a female voice modification(s), the voice modification engine 260 will use the association between the second hearing-impaired user and the female voice selection to be applied to the voice of the linked interpreter.

In some embodiments, at the time of scheduling or after the virtual meeting has begun, users needing assistance can be linked with participants providing assistance. For example, hearing-impaired participants requiring assistance can be manually linked (e.g., by the users themselves, by a scheduled, etc.) or automatically linked to a participant designated as an interpreter. By linking designated users and participants, different implementations of the present disclosure can be executed. For example, linking an interpreter with a hearing-impaired participant can dictate how the GUIs 300 for each of participants is affected and/or how a voice of an interpreter is modified, as discussed in greater detail herein.

In some embodiments, the video conference provider 210 can include a gesture detection engine 270 that monitors video feed received from client devices (e.g., cameras) for the users to determine whether they are performing sign language. The gesture detection engine 270 can be applied to all users or only to the participants who have identified themselves as hearing-impaired (e.g., via control 324). The gesture detection engine 270 can identify when a participant is using sign language (rather than general hand gestures) then designate that participant as the active speaker. This would be different than traditional active speaker activations, which would be audio based (e.g., when a new user speaks then they would be the active speaker). The gesture detection engine 270 can perform the analysis to detect the usage of sign language using any combination of methods. For example, the gesture detection engine 270 can use a combination of pattern recognition, AI, ML, etc. In some embodiments, the gesture detection engine 270 can ignore certain participants when performing such analysis. For example, the gesture detection engine 270 can ignore participants identified or designated as interpreter participants 334 because they should not be considered active speakers.

Figure 3:
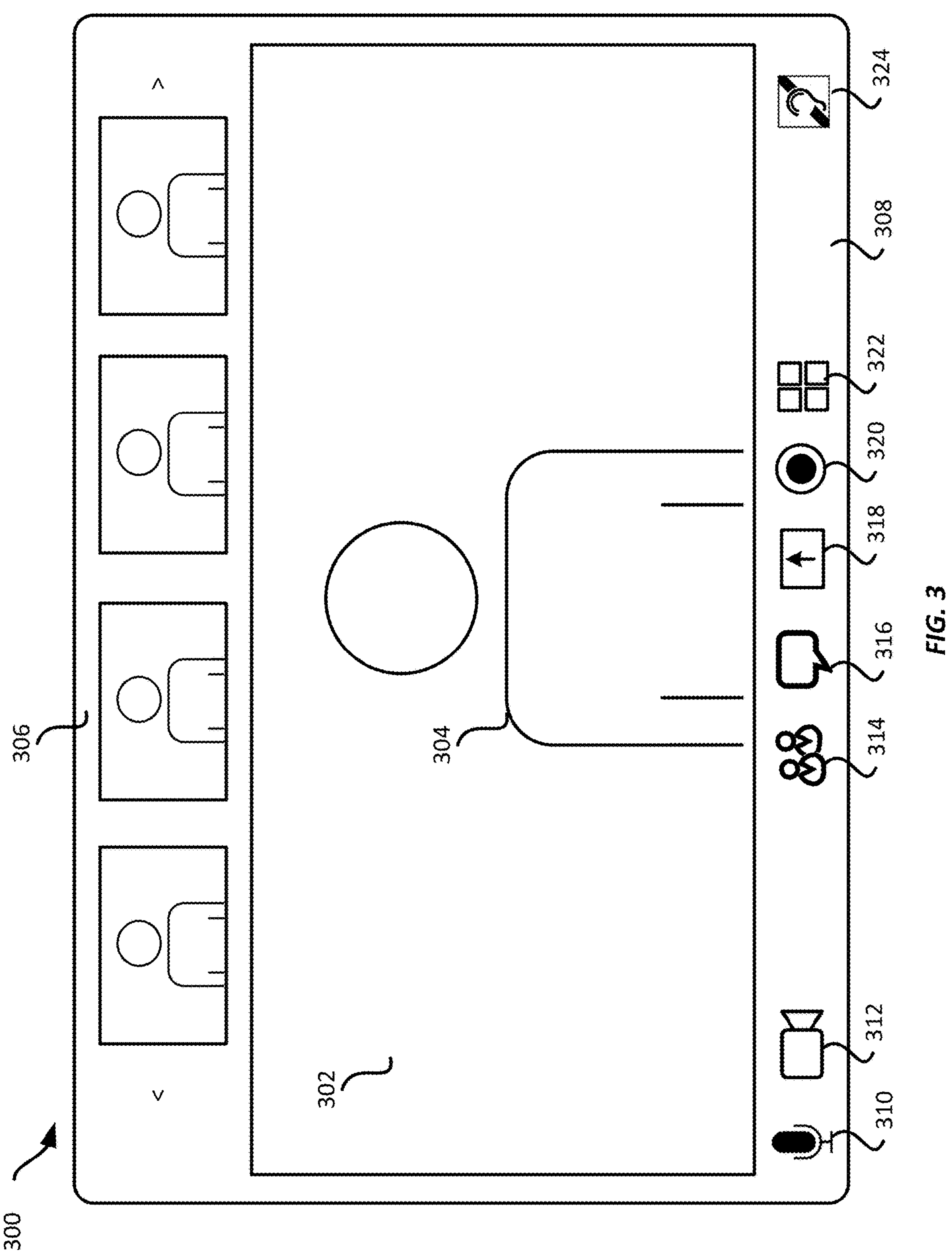
FIGS. 3, 4, 5, and 6 are illustrations of example graphical user interfaces ("GUIs") in accordance with various embodiments.

Referring now to FIG. 3, FIG. 3 shows an example graphical user interface (GUI) 300 that a user's (or participant's) client device may display while interacting with another participant during a virtual meeting in a conversation. A client device, e.g., client devices 220-250, executes video conferencing software, which in turn displays the GUI 300 on the client device's display. In this example, main viewing area 302 may display various images, depending on the configuration of the GUI 300 chosen by the videoconference participant. In this example, main viewing area 302 is displaying an image of the current or active speaker 304 in a videoconference. The GUI 300 also includes a gallery strip 306. Gallery strip 306 displays thumbnail images of the most recent speakers in the videoconference. The GUI 300 also includes a toolbar 308 that includes various user controls 310-324, as examples, controls for video devices, microphones, chat functions, gesture functions, and recording functions. Controls 310, 312 may allow the participant to toggle on or off audio or video streams, respectively, captured by a microphone or camera connected to the client device. Control 314 allows the participant to view any other participants in the video conference with the participant, while control 316 allows the participant to send text messages to the other participants. Control 318 allows the participant to share content from their client device. Control 320 allows the participant to toggle recording of the meeting, and control 322 allows the user to select an option to join a breakout room, though in this example, with only two participants, breakout room functionality may be disabled.

In some embodiments, the GUI 300 includes a control 324 that allows the participant to toggle various user assistance related functions that may be integrated with the video conferencing software. The assistance related functions can be functions that are specifically designed to assist impaired users participating within the virtual meeting. The GUI 300 can be automatically customized depending on the type of participant is being assisted. Different types of participants being assisted can include visually impaired participants, hearing impaired participants, as well as those providing assistance to those participants. For example, an interpreter or translator can be a participant in a virtual meeting by providing verbal interpretation of another participants sign language or providing sign language to the hearing-impaired participant based on verbal communications of the other participants.

Figure 4:
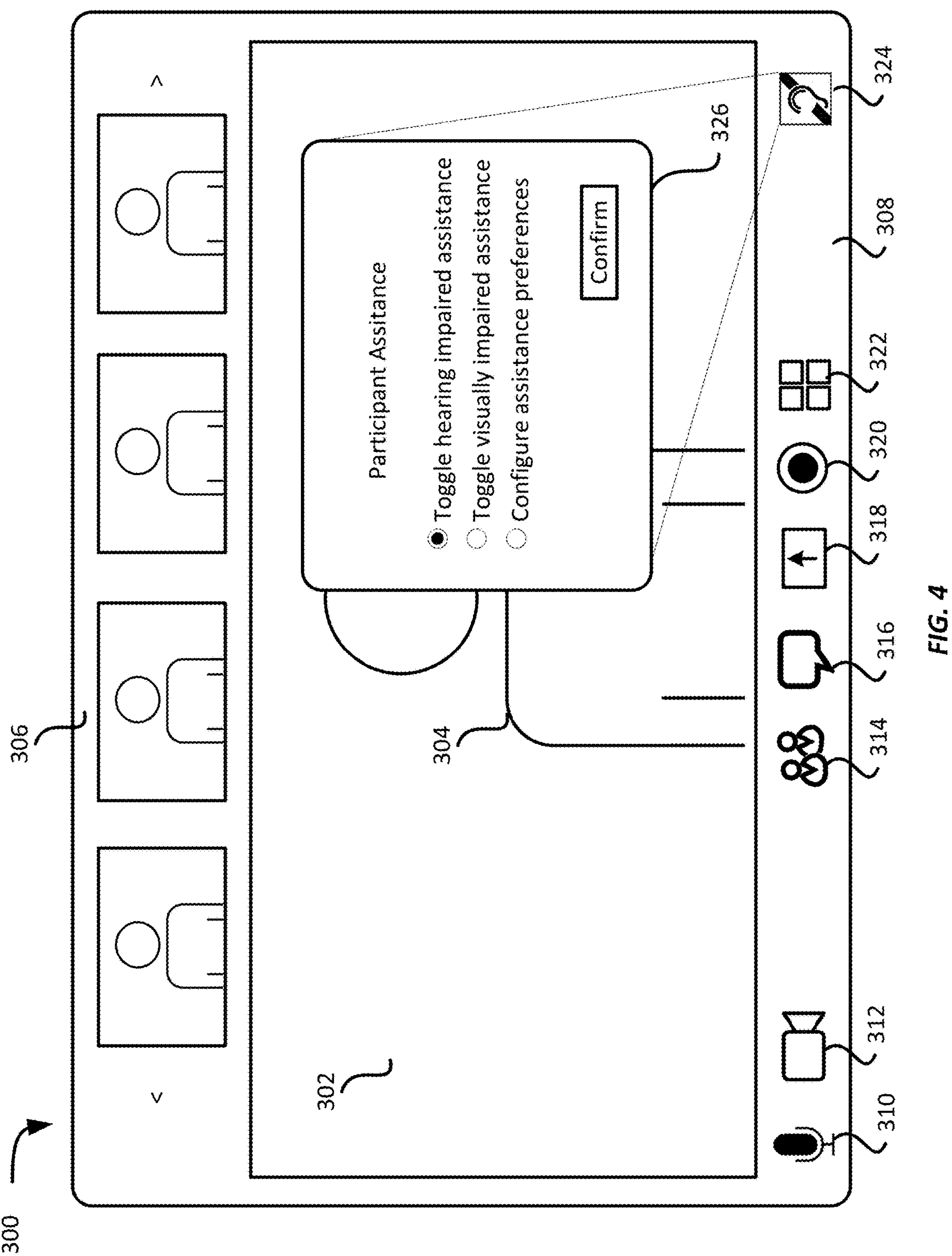

Referring now to FIG. 4, FIG. 4 shows an example GUI 300 that a user's (or participant's) client device may display while interacting with the control 324. In some embodiments, selecting the control 324 can cause a menu 326 to be provided to the participant. The control 324 menu 326 can include any combination of options that may be useful for a participant seeking assistance (or to assist) during a virtual meeting. For example, as shown in FIG. 4, the menu 326 can include selectable options for toggling hearing-impaired assistance, toggling visually impaired assistance, or configuring assistance preferences. The menu 326 can be accessed by the participant themselves or by someone assisting the participant (in person or remotely). For example, if a participant is visually impaired, they may need assistance in accessing the menu 326 and configuring their personal preferences.

In some embodiments, selection of the control 324 can automatically launch a predefined set of preferences, such as based on a user's profile stored by the video conference provider. The predefined set of preferences can include a default configuration for an impaired participant and/or can be set using a separate menu 326 button, screen, profile, etc. In some embodiments, activation of the control 324 (or the functions thereof) can be performed in response to a specific combination of keys, gestures, clicks, motions, etc. For example, if a visually impaired user selects the "~" key (or any other combination of keys, gestures, clicks, motions, etc.) on their keyboard in rapid succession (e.g., three times in a row) the control 324 (and its related function(s)) can be activated.

Figure 5:
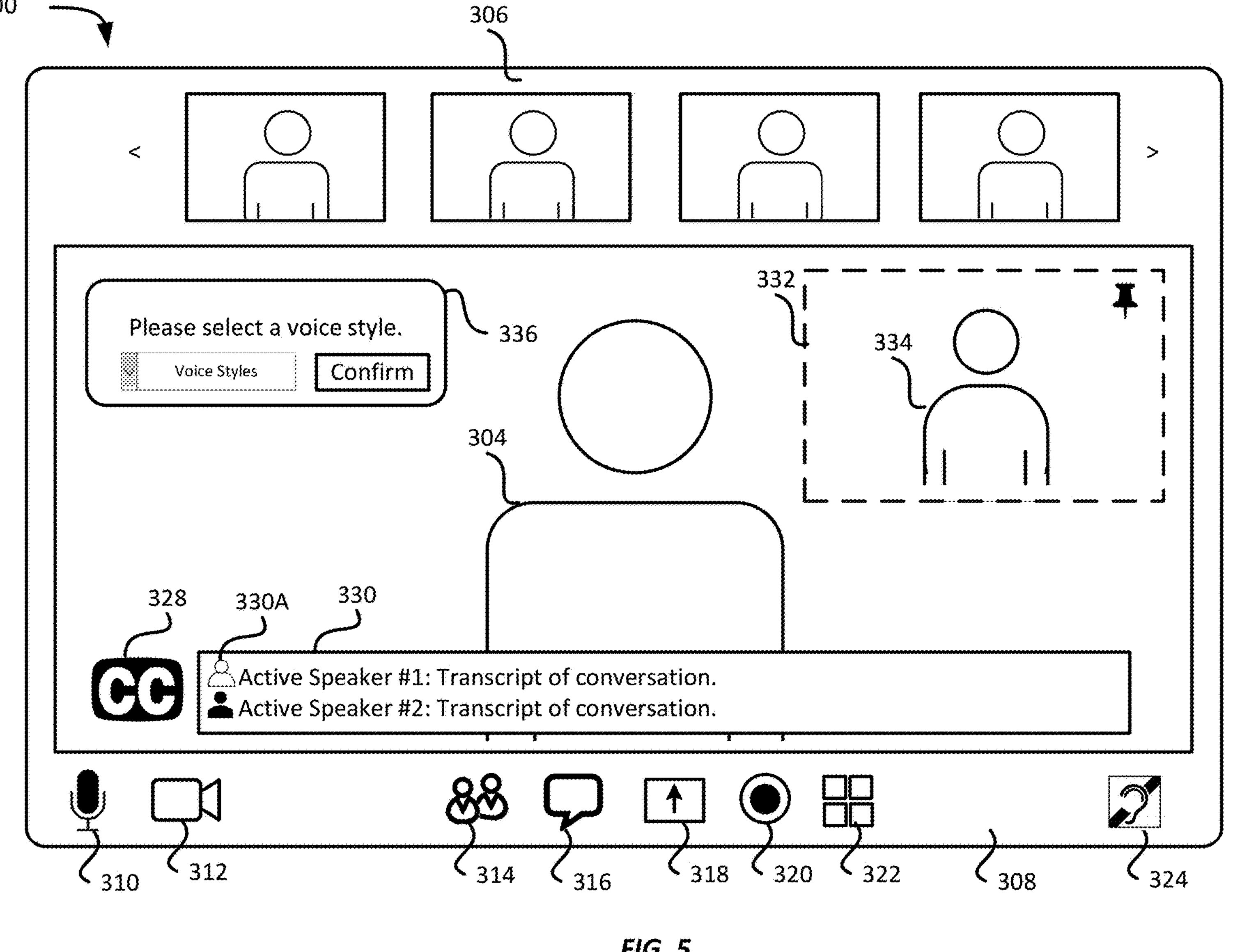

Referring now to FIG. 5, FIG. 5 shows an example GUI 300 that a user's (or participant's) client device may display after activating assistance for the hearing impaired, from the perspective of a hearing-impaired participant. In some embodiments, activation of the control 324 can cause the GUI 300 to automatically turn on closed captioning (CC) 328 so the participant can read everything the other participants are saying. As part of the CC 328, each active speaker will be identified by name (e.g., based on the participant roster) followed by a transcript 330 of what they are saying. In some embodiments, when a hearing-impaired assistance mode is activated, the GUI 300 can include a pinned viewing area 332 showing an interpreter participant 334. Alternatively, the interpreter participant 334 can be the main viewing area 302 in place of the active speaker 304 that is traditionally shown (with the active speaker 304 being moved to the pinned viewing area 332). With the pinned viewing area 332, the hearing-impaired participant can constantly see the interpreter within the GUI 300 regardless of when the active speaker 302 changes. In some embodiments, a voice selection notification 336 can be presented to the hearing-impaired participant to select a voice style, for example, provided by the voice modification engine 260. The voice selection notification 336 can be presented using any sort of selection options, for example, a drop-down menu. The voice selection notification 336 can also be provided as part of the menu 326.

Figure 6:
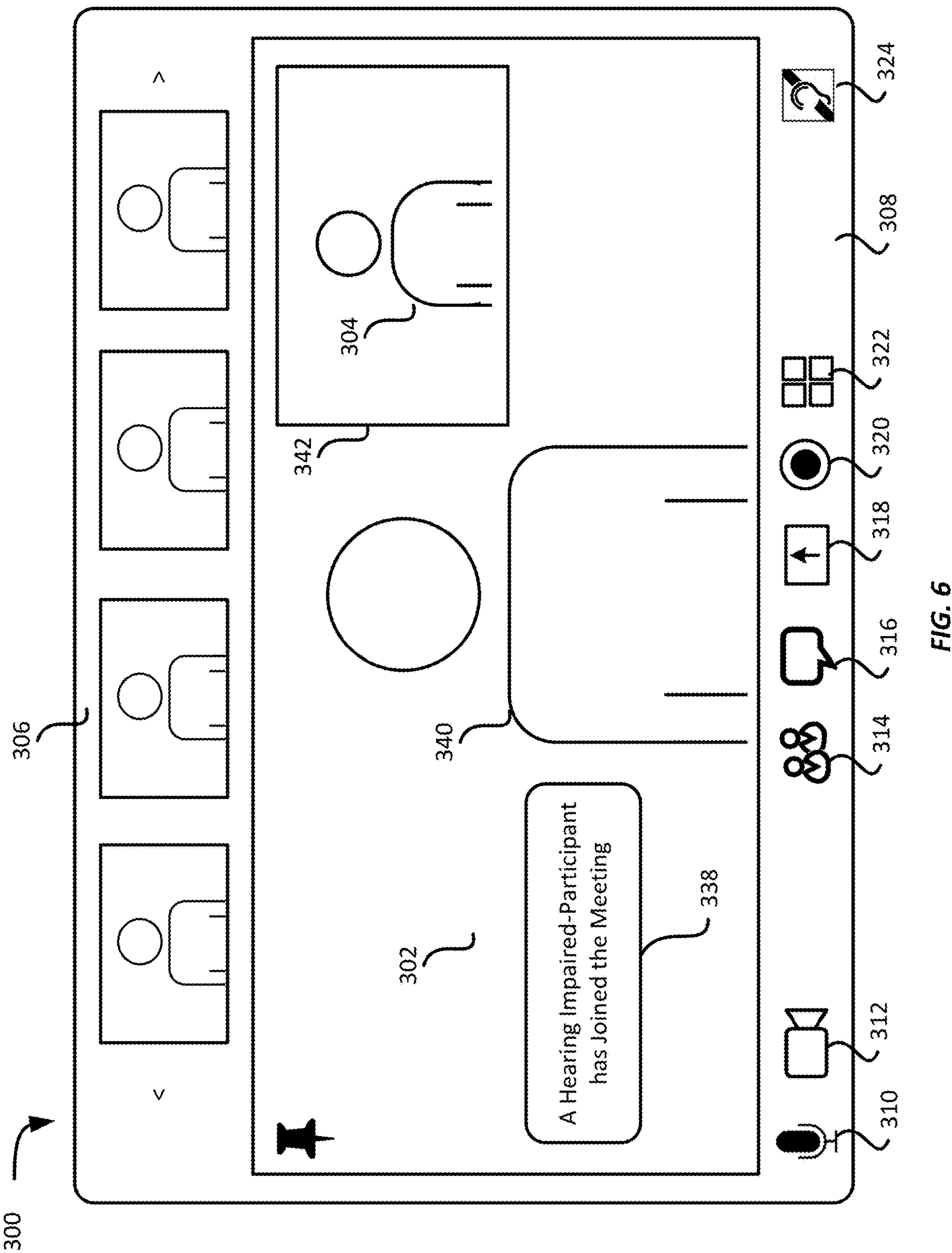

Referring now to FIG. 6, FIG. 6 shows an example GUI 300 that a user's (or participant's) client device may display after from the perspective of an interpreter. The interpreter can be preassigned during scheduling, assigned during a virtual conference, in response to selection of a command or button (e.g., control 324 or menu 326), etc. For example, the interpreter can select control 324 and then assign themselves as an interpreter while linking themselves to a specific participant(s). In another example, the interpreter can have an interpreter button to identify themselves as an interpreter and/or assigning themselves to be the interpreter on behalf of another participant(s). Once a participant is identified as an interpreter the GUI 300 will be updated to a predetermined configuration specifically designed for interpreters. The GUI 300 can provide a notification 338 to the interpreter that a hearing-impaired participant 340 assigned to the interpreter has joined the meeting. In some embodiments, the hearing-impaired participant 340 assigned to the interpreter can be pinned as the primary display for the interpreter, regardless of who the active speaker is. If multiple hearing-impaired persons join the meeting, one or more may be displayed in corresponding one or more pinned displays 342. The active speaker 304 can optionally be provided in a secondary viewing area 342, as shown in FIG. 6. While the interpreter will be viewing the hearing-impaired participant 340 in the main viewing area 302, other participants will see the hearing-impaired participant 340 only when they are provided as the active speaker (e.g., as shown as active speaker 302 in FIG. 3).

Figure 7:
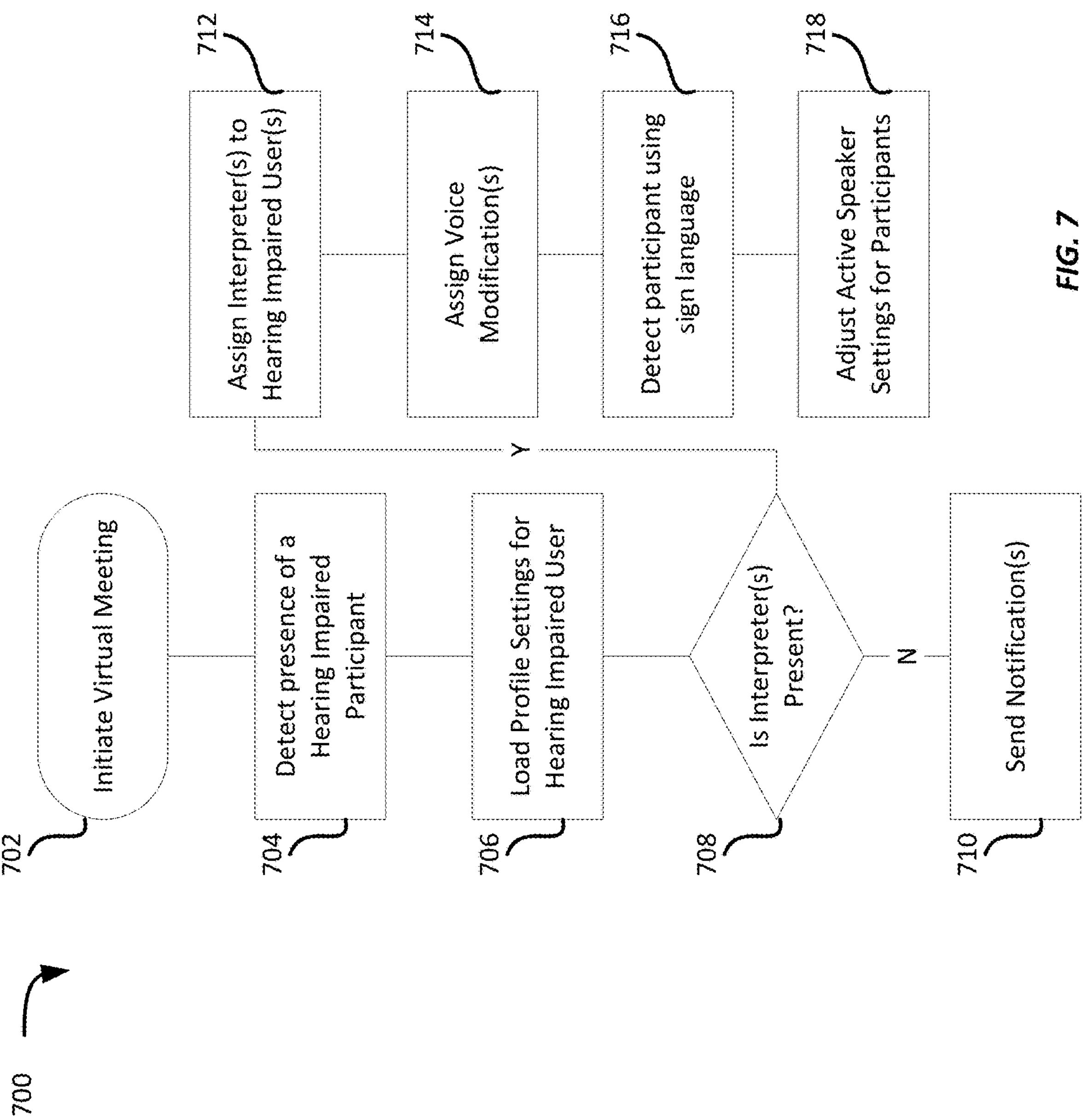
FIG. 7 is a flow chart depicting a process for assisting a hearing-impaired participant in a virtual conference in accordance with various embodiments.

Referring now to FIG. 7, FIG. 7 shows an example method 700 for participant interactions during a virtual conference. The method 700 of FIG. 7 will be described with respect to the systems 100, 200 shown in FIGS. 1 and 2; however, any suitable system according to this disclosure may be employed.

At block 702, a virtual meeting or conference is created and started. In some embodiments, the initiation of the virtual meeting can include identifying specific types of participants either as those that require assistance or those who are designated for providing assistance to others participating in the virtual meeting. For example, at the time of scheduling the meeting, a meeting coordinator can select one or more invitees as interpreters for hearing-impaired participants, thus linking these users. Thereafter, the invited interpreter will be provided with a unique GUI 300 once the meeting has begun, for example, as shown in FIG. 6. In another example, when accepting a meeting, users can designate themselves as an impaired user requesting assistance or as an interpreter to be providing assistance (generally or for another specific invitee).

At block 704, the presence of a hearing-impaired participant is received or detected. The presence of the hearing-impaired participant can be received or detected using any combination of methods. The hearing-impaired participant can initiate detection, for example, by selecting control 324 and indicating that they are hearing impaired or by including a hearing-impaired designation in their profile. In some embodiments, the system can automatically recognize that the person may be hearing-impaired, for example, by detecting the usage of sign language, such as by using gesture recognition on captured video of the person (e.g., using artificial intelligence (AI)/machine learning (ML), pattern recognition, etc.).

At block 706, the process 700 can load a predetermined combination of settings for the hearing-impaired user. The settings can be specific to the participant (e.g., provided via user profile), or they can be default settings used for all hearing-impaired users. The settings can include activating and/or deactivating any combination of audio and visual modifications to the video conferencing experience (e.g., GUI 300) for that user and the other participants. The settings can be settings available to all participants (but are turned off by default), or can be settings specifically designed for impaired users, or a combination thereof. For example, for a hearing-impaired participant, the GUI 300 can be updated to automatically turn on closed captioning to provide on-the-fly transcript of all discussions. The transcript can include an identifier of the active speaker followed by what the active speaker is saying, for example, as shown in FIG. 5. In addition to automatically activating CC, the process 700 can also automatically enable the hearing-impaired user's video so that others can read their hand signals (e.g., interpreters or other sign language users). In some embodiments, prior to making any adjustments to the GUI 300 and/or the user's settings, the process 700 can prompt the user whether they would like these options enabled.

In some embodiments, the loading of the predetermined settings can include modifying the length of the transcript and number of lines shown at any given time can be for hearing impaired users. For example, if the number of transcript lines is typically two lines, the GUI for the hearing-impaired participant may increase the number of transcript lines to four lines to allow the participant sufficient time to read the transcript during the conversation. The transcript can be further customized in any manner that may assist the user in following the dialog. For example, different active speakers can have tagged icons 330A and/or different colored text such that the user can easily identify when different participants are speaking.

In some embodiments, the loading of the predetermined settings can include modifying the GUI for the hearing-impaired participant to provide a pinned viewing area 332 showing their assigned interpreter participant 334. This configuration would allow for the hearing-impaired user to maintain visual contact with the person providing interpretation to the rest of the participants. This may be helpful to identify when the interpreter participant 334 is done speaking, view any non-verbal feedback the interpreter participant 334 may provide back to the hearing-impaired participant, see body language of the interpreter participant 334, may provide a point of reference for when the hearing-impaired participant is performing sing language, etc.

In some embodiments, the loading of the predetermined settings can include presenting the hearing-impaired participant with an option to select a voice style for their linked interpreter participant 334. For example, the different voice styles can be presented to the user in a voice selection notification 336 within the GUI, as shown in FIG. 5. The voice styles can have different options related to various voice characteristics, such as for example, gender, pitch, tone, etc. (e.g., as provided by the voice modification engine 260). In instances where more than one participant is sharing the same interpreter, each of the participants will receive different voice styles, either through personal selection or through automatic assignment. Once a voice style is selected (by user or automatically) the user's preference is updated and stored by the system. In some embodiments, the selected voice style for their linked interpreter participant 334 will be used to modify the voice of the interpreter as they speak on behalf of the linked participant. For example, if a male interpreter is speaking and a hearing-impaired participant selected a female voice, the voice of the interpreter will be modified, modulated, transformed, etc. to sound female and then presented to the other participants in that manner.

At block 708, a determination is made as to whether a user designated as an interpreter participant 334 is participating in the virtual meeting. The designation whether an interpreter participant 334 is participating in (or will be participating in) a virtual meeting can be performed using any combination of methods. For example, an interpreter participant 334 can be designated as such during scheduling the virtual meeting, as part of a user's profile, upon joining the virtual meeting, or in response to selecting a button within the GUI 300 (e.g., an interpreter participant 334 button). In some embodiments, each designated interpreter participant 334 is assigned to one or more other participants (e.g., hearing impaired participants) of the virtual meeting. The assignment to other participants can be performed using any combination of methods. For example, an interpreter can select a button or option in their profile (e.g., via participant list) to indicate that they are an interpreter and may select another participant for who they are going to act as an interpreter. In another example, a hearing-impaired user, can select a participant to be their interpreter (e.g., via participant list). The assignment can be performed during scheduling the virtual meeting, upon joining the virtual meeting, or in response to selecting a setting within the GUI 300 (e.g., control 324).

Continuing with block 708, the determination whether a designated interpreter participant 334 is participating in (or will be participating in) a virtual meeting can be performed using any combination of methods. For example, the participant list for the virtual meeting (listing users which have joined the meeting) can be compared against previously designated interpreters to determine if the designated interpreters are present in the virtual meeting. If the determination is made that no user is designated as an interpreter participant 334 (and one has been requested) or that a designated interpreter is not participating in the virtual meeting, then the process advances to block 710. If the determination is made that a user is designated as an interpreter participant 334 and is participating in the virtual meeting, then the process advances to block 712.

At block 710, one or more notifications can be provided to users, participating or scheduled to participate in a virtual meeting, when no user is designated as an interpreter participant 334 or that a designated interpreter is not participating in the virtual meeting. The notifications can be sent to any combination of one or more users that have accepted an invite to the virtual meeting as an interpreter and one or more users who requested or associated themselves with an interpreter for the virtual meeting. Additionally, the notifications can be provided within the GUI for the virtual meeting or through another medium (e.g., text message, email, app notification, etc.). For example, if a designated interpreter participant 334 has not logged in for a virtual meeting, they can be notified outside of the virtual meeting that they are expected to be joining to assist an impaired user. If an interpreter later joins the meeting, the method can return to block 708 and then advance to block 712.

At block 712, each interpreter participant 334 participating in the virtual meeting is assigned to one or more hearing impaired participants. The interpreter participant(s) 334 can be assigned prior to the start of the virtual meeting, at the start of the virtual meeting, or while the virtual meeting is in progress. Once an interpreter participant 334 is assigned to a hearing-impaired participant, the two entities can be linked to one another by the system. The users will be linked for the duration of the virtual meeting and may need to be relinked in future meetings if they are associated with one another again. Alternatively, the users can be linked for all meetings until they are actively unlinked, for example, by one of the linked users. The two entities being linked can be used to control how the audio visual for each of the entities is provided to other participants within the virtual meeting, as discussed in greater detail herein.

At block 714, voice modification(s) to be performed are assigned to the interpreter participants 334 based on the preferences of the hearing-impaired user(s). The hearing-impaired participants previously select which style of voice they want to represent them, through which a voice modification(s) will be applied to the speaking voice of the interpreter participant 334. When the interpreter participant 334 begins speaking on behalf of the hearing-impaired participant, the system will change the voice of the interpreter participant 334 to match the speaking voice modification(s) selected by the hearing-impaired participant. Additionally, when using the same interpreter participant 334, each of the hearing-impaired participants will have a different voice modification(s) assigned to the voice of the interpreter participant 334. The different voice modification(s) will enable each hearing-impaired participant to have their own "voice" when they are the active speaker such that other participants in the virtual meeting can differentiate between both hearing impaired attendee.

In some embodiments, the assigned voice modification(s) will be applied to the speaking voice of the interpreter participant 334 on the fly. For example, as the interpreter participant 334 speaks, the voice modification engine 260 will receive the unmodified voice input from the interpreter participant 334 client, apply a voice modification(s) (e.g., pitch, frequency, tone, etc.) to the voice input, and output the modified version of the interpreter participant's 334 voice to the other participants in the virtual meeting. When multiple hearing-impaired participants are associated with the same interpreter participant 334, then different voice modification(s) are applied to the voice input. The different voice input modifications can be based on which hearing-impaired participant is the active speaker (e.g., which user is signing). For example, when a first hearing impaired participant is signing and has assigned a male voice modification(s), the voice modification engine 260 will use the association between the first hearing impaired participant and the male voice modification to be applied to the voice of the linked interpreter participant 334 and when a second hearing impaired participant is signing and has assigned a female voice modification(s), the voice modification engine 260 will use the association between the second hearing impaired participant and the female voice modification to be applied to the voice of the linked interpreter participant 334.

At block 716, one or more hearing-impaired participants using sign language is detected. For example, when a hearing-impaired participant starts to use sign language, the system (e.g., gesture detection engine 270) will recognize the sign language usage and identify the currently signing hearing-impaired participant as the active speaker. The gesture detection engine 270 can identify when a participant is using sign language (rather than general hand gestures) then designate that participant as the active speaker. In some embodiments, the gesture detection engine 270 can ignore certain participants when performing such analysis. For example, the gesture detection engine 270 can ignore participants identified as interpreter participants 334 because they should not be considered active speakers.

At block 718, the visual and audio outputs for active speaker are modified for reception by the other participants in the virtual meeting. In some embodiments, when the hearing-impaired participant is identified as an active speaker, the system will set the video feed from the person using sign language as the video feed to be displayed in the main viewing area 302 for the other participants participating in the virtual meeting. Additionally, when the hearing-impaired participant is identified as an active speaker, the system will look up the linked interpreter for the hearing-impaired participant and set the modified audio feed from the interpreter participant 334 to be the audio output as the active speaker for the other participants participating in the virtual meeting. In combination, the video feed of the signing participant is displayed as active speaker while modified audio from the interpreter participant 334 is output. As such, other participants will see the hearing-impaired participant 340, when they are the active speaker (e.g., as shown as active speaker 302 in FIG. 3) and hear the modified audio from the interpreter participant 334 (with or without a gallery perspective of the interpreter participant 334). This in contrast to a traditional operation where the user who is actively speaking (e.g., the interpreter participant 334) would be displayed in the main viewing area 302 as the active speaker while the participant using sing language would not be displayed. In some embodiments, if no participants are actively signing, then interpreter can speak (with unmodified audio output) and be shown as active speaker. For example, the interpreter can speak up during meeting to clarify or ask other participants if they can repeat what they said, slow down, speak more clearly, etc.

Implementing process 700 provides many advantages for when hearing impaired users participate in a virtual meeting. In operation, when a hearing-impaired user joins a meeting, they will have the option to select they are hearing impaired. When the hearing-impaired selection is selected, closed captioning will be auto enabled and the user will have an option to pick which style of voice they want to use to represent them. This will notify the interpreter that hearing impaired user has entered the meeting. When a first hearing impaired user starts to use sign language, the system will recognize sign language and change the video feed of the person using sign language as the primary video feed. The interpreter will begin speaking on behalf of the first hearing-impaired user and the system will change the voice of the interpreter to match the voice the first hearing impaired user chose. When a second hearing impaired user begins to sign, the primary video will change over to that user. When the interpreter begins to speak, a different voice will be used for the second hearing impaired user to help other users differentiate between both hearing impaired users.

This is in contrast to existing systems and methods when a meeting has multiple hearing-impaired attendees and there is only one interpreter. Specifically, the interpreter does not have multiple voices so it may be difficult for other users to delineated who is speaking. Additionally, the attendee video feed is not primary because they are not the active speaker (audibly) therefore this may be frustrating for the hearing-impaired attendee to be included within the conversation and convey their body language.

Referring now to FIG. 8, FIG. 8 shows an example method 800 for participant interactions during a virtual conference. The method 800 of FIG. 8 will be described with respect to the systems 100, 200 shown in FIGS. 1 and 2; however, any suitable system according to this disclosure may be employed.

At block 802, a virtual meeting or conference is created and started. In some embodiments, the initiation of the virtual meeting can include identifying specific types of participants as those that require assistance during virtual meeting. For example, when accepting a meeting, users can designate themselves as an impaired user requesting assistance.

At block 804, the presence of a visually impaired participant is received or detected. The presence presences of the visually impaired participant can be received or detected using any combination of methods. The visually impaired participant can initiate detection, for example, by selecting control 324 and indicating that they are hearing impaired or by including a visually impaired designation in their profile. In some embodiments, when a visually impaired users joins a meeting, the user selects a specific key combination to enable visual impairment aids. For example, the user can select the "~" key (or any other combination of keys, gestures, clicks, motions, etc.) on their keyboard in rapid succession (e.g., three times in a row) to identify themselves to the system as being visually impaired. The visually impaired user can use any combination of devices for self-identification as an impaired user who elects to receive additional audio announcements (e.g., active speaker). Additionally, the user can be requesting assistance through any different combination of method for joining a meeting. For example, a user dialing into a virtual conference using a phone can press a keypad option, e.g., number 6, for visually impaired assistance, which can cause the system to generate speaker announcement tools. Regardless of activation method, the visual impairment aids can be toggled on and off throughout the meeting using the specific key combination. In some embodiments, the specific key combination can cause a menu to be dictated to the user, through which the user can specify particular settings. The settings can be selected by the user through any combination of verbal responses, keystrokes, mouse clicks, gestures, etc. Additionally, the input can be the same device providing the virtual meetings, or a secondary device used by the visually impaired user (e.g., smart phone).

At block 806, the process 800 can load a predetermined combination of settings for the visually impaired user. The settings can be specific to the participant (e.g., provided via user profile), or they can be default settings used for all visually impaired users. The settings can include activating and/or deactivating any combination of audio modifications to the video conferencing experience (e.g., GUI 300) for that user and the other participants. The settings can be settings available to all participants (but are turned off by default), or can be settings specifically designed for impaired users, or a combination thereof. For example, for a visually impaired participant, the audio settings can be updated to automatically turn on audio descriptions. The audio descriptions can include an audio identification of the active speaker and/or audio identification of other participant actions, such as for example, share screen, loading application, etc. The activation of the control 324 (or the functions thereof) can be a onetime activation (e.g., for duration of the meeting) or it can be a limited duration activation. For example, the user can hit the "~" key three times at the beginning of the meeting to be provided with audio descriptions throughout the meeting, or the user can hit the "~" key three times every time they want an identification for an active speaker. The settings can also include the user specifying no visually impairment assistance.

At block 808, a determination is made as to whether the visually impaired user would like notifications to be provided to other users. The notifications can be related to the impairment of the user, for example, notifications can be provided to users, notifying them that the user is visually impaired, such that visual aids may not be conveyed to the user. If the visually impaired user would like the notification to be provided, the process 800 can advance to block 810, otherwise the process 800 will advance to block 812.

At block 810, one or more notifications can be provided to users, participating or scheduled to participate in a virtual meeting, when no user is designated as visually impaired. The notifications can be provided within the GUI for the virtual meeting or through an audio prompt.

At block 812, audio prompts are played including the default audio descriptions or the audio descriptors selected by the user or according to the user's preferences. Such audio descriptors can include an audio identification of the active speaker (pulled from the participant roster of users included within a meeting) and/or audio identification of other participant actions, such as for example, joining/leaving the meeting, sharing a screen, loading an application, etc. In some embodiments, the audio can be placed in a buffer for a predetermined period of time to enable identification of the active speaker prior to audio playback. For example, the audio can be placed in a 2 second buffer while the identification of the speaker is played, followed play playing the audio from the buffer. The audio descriptors can be provided from predetermined any combination of audio clips or derived using text to speech. For example, for controls 310-324 can be predetermined audio files whereas reading from the participant list can be text to speech translation. In some embodiments, the audio descriptions of speakers, controls, etc. can be played at that client such that only the visually impaired user will hear the prompts. While the audio can be played on the client side, the server side can provide the audio announcements to the client for playback, and the announcements can be provided only to those who requesting visually impaired assistance. The system will announce only to the visually impaired attendee who the active speaker is. In some embodiments, audio discussion and/or transcripts for users (unimpaired, hearing impaired, or visually impaired) can be buffered during the meeting, such that the user can elect to slow down the discussion. The buffered discussion can be implemented automatically as part of the settings for a visually impaired user, such that audio identification of the active speaker and action(s) of the participants can be appropriately spaced between active discussion.

Implementing process 800 provides many advantages for when visually impaired users participate in a virtual meeting. Conventionally, when a visually impaired attendee joins a meeting, it may be difficult to identify who is speaking, especially if they had not previously or frequently communicated verbally. This may leave the visually impaired user frustrated and unable to interact efficiently or appropriately. In operation, the process 800 would provide the visually impaired user with a mechanism (e.g., pressing a key combination either on their phone or on their computer) to cause their system to identify/announce the active speaker and other actions occurring during the meeting which the user cannot visualize.

While the operations of processes 700 and 800 are described as being performed by the systems 100, 200, it should be understood that any suitable device may be used to perform one or more operations of this process. Processes 700 and 800 described above) are illustrated as logical flow diagrams, each operation of which represents a sequence of operations that can be implemented in hardware, computer instructions, or a combination thereof. Additionally, any of the steps can be performed by the various components of the system 100, 200. For example, the steps can be performed on a server or cloud, on a client computing device, or a combination thereof. For example, elements of steps 700 and 800 can be processed on the client side and transmitted to the server(s) for distribution to the other clients or the server can perform the processing. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 700 and 800.

Figure 9:
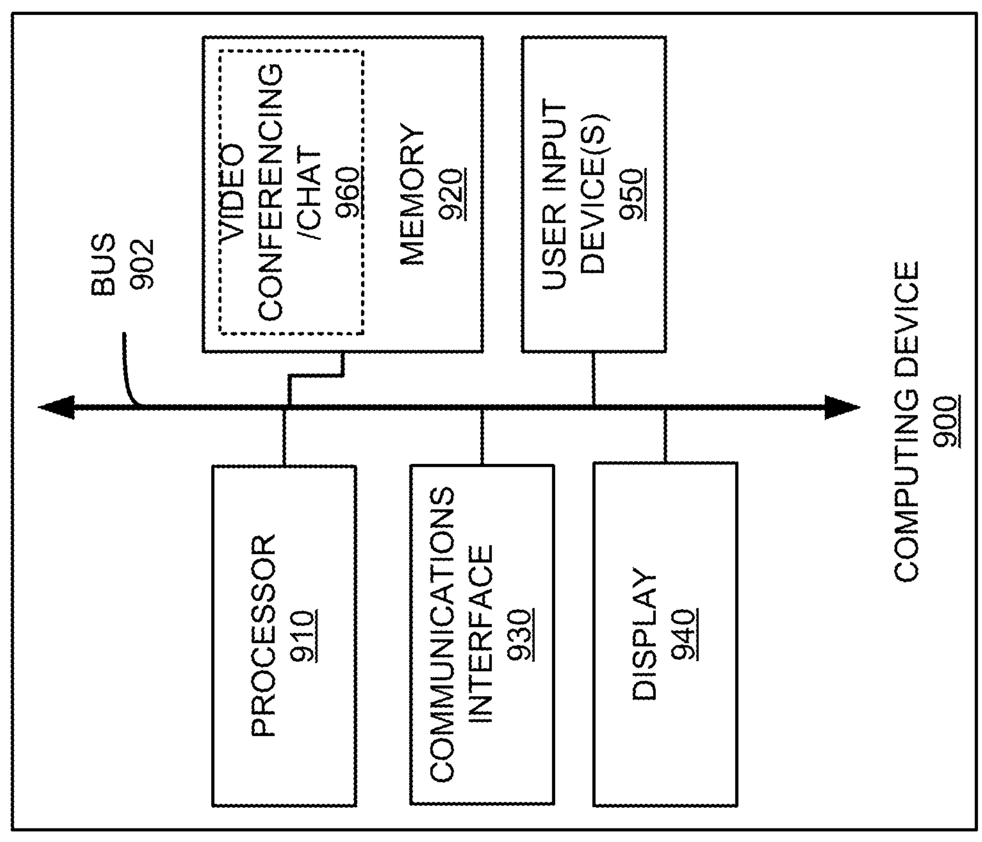
FIG. 9 shows an example computing device suitable for use with systems and methods in accordance with various embodiments.

Referring now to FIG. 9, FIG. 9 shows an example computing device 900 suitable for use in example systems or methods providing assistance to visually impaired and/or hearing-impaired users accessing a video conferencing system according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing assistance to visually impaired and/or hearing-impaired users accessing a video conferencing system according to different examples, such as part or all of the example methods 700, 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual meeting, etc. such as described throughout this disclosure, etc.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for referencing a user in chat, the method comprising:
- initiating, by a video conference provider, a virtual meeting hosting a plurality of participants;
- detecting, by the video conference provider, a presence of at least one hearing-impaired participant among the plurality of participants in the virtual meeting;
- updating, by the video conference provider, one or more audio and visual settings for providing assistance to the at least one hearing-impaired participant, wherein the one or more audio and visual settings comprise a voice style setting corresponding to each of the at least one hearing-impaired participant;
- detecting, by the video conference provider, a presence of an interpreter participant;
- transmitting, by the video conference provider, an indication of one or more hearing-impaired participants assigned to the interpreter participant to cause a client device associated with the interpreter participant to update a graphical user interface (GUI) to display the one or more hearing-impaired participants;
- executing, by the video conference provider, a machine learning model on received video feed associated with the at least one hearing-impaired participant to determine that a hearing-impaired participant of the one or more hearing-impaired participants is using sign language;
- notifying, by the video conference provider, the interpreter participant that the hearing-impaired participant is using sign language;
- receiving, by the video conference provider, an audio stream of the interpreter participant translating the sign language, the audio stream comprising speech;
- modifying, by the video conference provider, the speech of the interpreter participant based on applying the voice style setting corresponding to the hearing-impaired participant to the speech of the interpreter participant to obtain a modified speech of the interpreter participant; and
- providing, by the video conference provider, the modified speech of the interpreter participant as an audio output associated with the hearing-impaired participant.

2. The method of claim 1, wherein detecting a presence of at least one impaired participant comprises receiving a consecutive selection of a predetermined combination of keys.

3. The method of claim 1, wherein the plurality of participants comprise a visually impaired participant, wherein automatically adjusting one or more audio and visual elements comprises delivering audio prompts that identify an active speaker to a client device associated with the visually impaired participant.

4. The method of claim 1, further comprising receiving a selection of a voice style for each of the at least one hearing-impaired participant.

5. The method of claim 4, further comprising identifying the interpreter participant and linking the interpreter participant to the at least one hearing-impaired participant.

6. The method of claim 4, further comprising assigning the hearing-impaired participant as an active speaker within a main viewing area and providing modified audio from the interpreter participant using the selection of the voice style.

7. A system comprising:
- a communications interface;
- a non-transitory computer-readable medium; and
- one or more processors communicatively coupled to the communications interface and the non-transitory computer-readable medium, the one or more processors configured to execute processor-executable instructions stored in the non-transitory computer-readable medium to:
  - initiate a virtual meeting hosting a plurality of participants;
  - detect a presence of at least one-hearing-impaired participant among the plurality of participants;
  - update one or more audio and visual settings for providing assistance to the at least one hearing-impaired participant, wherein the one or more audio and visual settings comprise a voice style setting corresponding to each of the at least one hearing-impaired participant;
  - detecting a presence of an interpreter participant;
  - transmit an indication of one or more hearing-impaired participants assigned to the interpreter participant to cause a client device associated with the interpreter participant to update a graphical user interface (GUI) to display the one or more hearing-impaired participants;
  - execute a machine learning model on received video feed associated with the at least one hearing-impaired participant to determine that a hearing-impaired participant of the one or more hearing-impaired participants is using sign language;
  - notify the interpreter participant that the hearing-impaired participant is using sign language;
  - receive an audio stream of the interpreter participant translating the sign language, the audio stream comprising speech;
  - modify the speech of the interpreter participant based on applying the voice style setting corresponding to the hearing-impaired participant to the speech of the interpreter participant to obtain a modified speech of the interpreter participant; and
  - provide the modified speech of the interpreter participant as an audio output associated with the hearing-impaired participant.

8. The system of claim 7, wherein the one or more processors are configured to execute further processor-executable instructions stored in the non-transitory computer-readable medium to detect the presence of the at least one hearing-impaired participant by receiving a consecutive selection of a predetermined combination of keys.

9. The system of claim 7, wherein the plurality of participants comprise a visually impaired participant, wherein the one or more processors are configured to execute further processor-executable instructions stored in the non-transitory computer-readable medium to deliver audio prompts that identify an active speaker to a client device associated with the visually impaired participant.

10. The system of claim 7, wherein the one or more processors are configured to execute further processor-executable instructions stored in the non-transitory computer-readable medium to receive a selection of a voice style for each of the at least one hearing-impaired participant.

11. The system of claim 10, wherein the one or more processors are configured to execute further processor-executable instructions stored in the non-transitory computer-readable medium to identify the interpreter participant and linking the interpreter participant to the at least one hearing-impaired participant.

12. The system of claim 10, wherein the one or more processors are configured to execute further processor-executable instructions stored in the non-transitory computer-readable medium to assign the hearing-impaired participant as an active speaker within a main viewing area and providing modified audio from the interpreter participant using the selection of the voice style.

13. A non-transitory computer-readable memory comprising processor-executable instructions configured to cause one or more processors to:

initiate a virtual meeting hosting a plurality of participants;

detect a presence of at least one-hearing-impaired participant among the plurality of participants;

update one or more audio and visual settings for providing assistance to the at least one hearing-impaired participant, wherein the one or more audio and visual settings comprise a voice style setting corresponding to each of the at least one hearing-impaired participant;

detect a presence of an interpreter participant;

transmit an indication of one or more hearing-impaired participants assigned to the interpreter participant to cause a client device associated with the interpreter participant to update a graphical user interface (GUI) to display the one or more hearing-impaired participants;

execute a machine learning model on received video feed associated with the at least one hearing-impaired participant to determine that a hearing-impaired participant of the one or more hearing-impaired participants is using sign language;

notify the interpreter participant that the hearing-impaired participant is using sign language;

receive an audio stream of the interpreter participant translating the sign language, the audio stream comprising speech;

modify the speech of the interpreter participant based on applying the voice style setting corresponding to the hearing-impaired participant to the speech of the interpreter participant to obtain a modified speech of the interpreter participant; and provide the modified speech of the interpreter participant as an audio output associated with the hearing-impaired participant.

14. The non-transitory computer-readable memory of claim 13, further comprising processor-executable instructions configured to cause one or more processors to detect the presence of the at least one hearing-impaired participant by receiving a consecutive selection of a predetermined combination of keys.

15. The non-transitory computer-readable memory of claim 13, further comprising processor-executable instructions configured to cause one or more processors to deliver audio prompts that identify an active speaker to a client device associated with a visually impaired participant.

16. The non-transitory computer-readable memory of claim 13, further comprising processor-executable instructions configured to cause one or more processors to receive a selection of a voice for each of the at least one hearing-impaired participant.

17. The non-transitory computer-readable memory of claim 16, further comprising processor-executable instructions configured to cause one or more processors to identify the interpreter participant and linking the interpreter participant to the at least one hearing-impaired participant.

18. The non-transitory computer-readable memory of claim 17, further comprising processor-executable instructions configured to cause one or more processors to assign the hearing-impaired participant as an active speaker within a main viewing area and providing modified audio from the interpreter participant using the selection of the voice style.

19. The method of claim 1, wherein the at least one hearing-impaired participant comprises multiple hearing-impaired participant, wherein the voice style setting comprises multiple voice characteristics, comprising gender, pitch, tone, and frequency, and wherein each of the multiple hearing-impaired participants corresponds to a unique voice style setting.

20. The method of claim 1, further comprising determining that the hearing-impaired participant is using sign language by using an artificial intelligence-based pattern recognition algorithm.

* * * * *